(12) United States Patent
Arakawa (10) Patent No.: US 9,282,240 B2
(45) Date of Patent: Mar. 8, 2016

(54) IMAGING DEVICE AND IMAGING METHOD

(71) Applicant: Panasonic Corporation, Osaka (JP)

(72) Inventor: Kenji Arakawa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 54 days.

(21) Appl. No.: 14/210,606

(22) Filed: Mar. 14, 2014

(65) Prior Publication Data

US 2015/0103206 A1    Apr. 16, 2015

(30) Foreign Application Priority Data

Oct. 10, 2013  (JP) .................... 2013-212466
Feb. 19, 2014  (JP) .................... 2014-029217

(51) Int. Cl.
*H04N 5/232* (2006.01)
*H04N 5/217* (2011.01)
*H04N 5/347* (2011.01)
*H04N 9/04* (2006.01)

(52) U.S. Cl.
CPC .......... *H04N 5/23229* (2013.01); *H04N 5/217* (2013.01); *H04N 5/347* (2013.01); *H04N 9/045* (2013.01)

(58) Field of Classification Search
CPC .................. H04N 5/23229; H04N 5/217
See application file for complete search history.

(56) References Cited

U.S. PATENT DOCUMENTS

| | | | | |
|---|---|---|---|---|
| 7,199,829 B2 * | 4/2007 | Matsui | ................ | H04N 1/6011 348/333.02 |
| 7,787,026 B1 * | 8/2010 | Flory | .................. | H04N 1/2166 348/231.99 |
| 8,054,341 B2 * | 11/2011 | Kang | .................. | H04N 1/2145 348/231.2 |
| 8,854,488 B2 * | 10/2014 | Shiomi | ................ | H04N 5/372 348/222.1 |
| 2004/0196381 A1 * | 10/2004 | Matsuzaka | ........... | H04N 1/2158 348/222.1 |
| 2013/0147990 A1 * | 6/2013 | Shintani | ............. | H04N 1/00347 348/231.99 |

FOREIGN PATENT DOCUMENTS

JP    2008-053934 A    3/2008

* cited by examiner

*Primary Examiner* — Lin Ye
*Assistant Examiner* — Peter Chon
(74) *Attorney, Agent, or Firm* — Renner, Otto, Boisselle & Sklar, LLP

(57) ABSTRACT

An imaging device includes a controller; an image sensor connected to the controller and outputting RAW data; and a memory connected to the controller. The image sensor is configured to output the RAW data to the controller at a predetermined pixel output rate. The controller generates first image data by reducing the RAW data output from the image sensor. The controller generates second image data by carrying out correction processing with respect to the first image data. The controller is configured to store the RAW data output from the image sensor and the second image data in the memory.

12 Claims, 7 Drawing Sheets

IMAGING DEVICE AND IMAGING METHOD

BACKGROUND

A technology of shortening a time necessary for image processing in a multiple continuous-shooting mode in an electronic camera (see, for example, Japanese Patent Application Unexamined Publication No. 2008-53934).

SUMMARY

An imaging device of the present disclosure includes a controller, an image sensor connected to the controller and outputting RAW data, and a memory connected to the controller. The image sensor is configured to output the RAW data to the controller at a predetermined pixel output rate. The controller generates first image data by reducing the RAW data output from the image sensor. The controller generates second image data by carrying out correction processing with respect to the first image data. The controller is configured to store the RAW data output from the image sensor and the second image data in the memory.

DETAILED DESCRIPTION

Hereinafter, embodiments are described in detail. The embodiments are described appropriately with reference to drawings. However, unnecessarily detailed description may be omitted. For example, detailed description of the already well-known matters, or repeated description of substantially the same configurations may omitted for easy understanding by a person skilled in the art by avoiding redundancy in description.

Note here that the present inventors provide attached drawings and the following description so that a person skilled in the art can fully understand the present disclosure. The present inventors do not intend to mean that subject matters described in claims are limited by the present disclosure.

1. Configuration of Digital Camera 400

Figure 1:
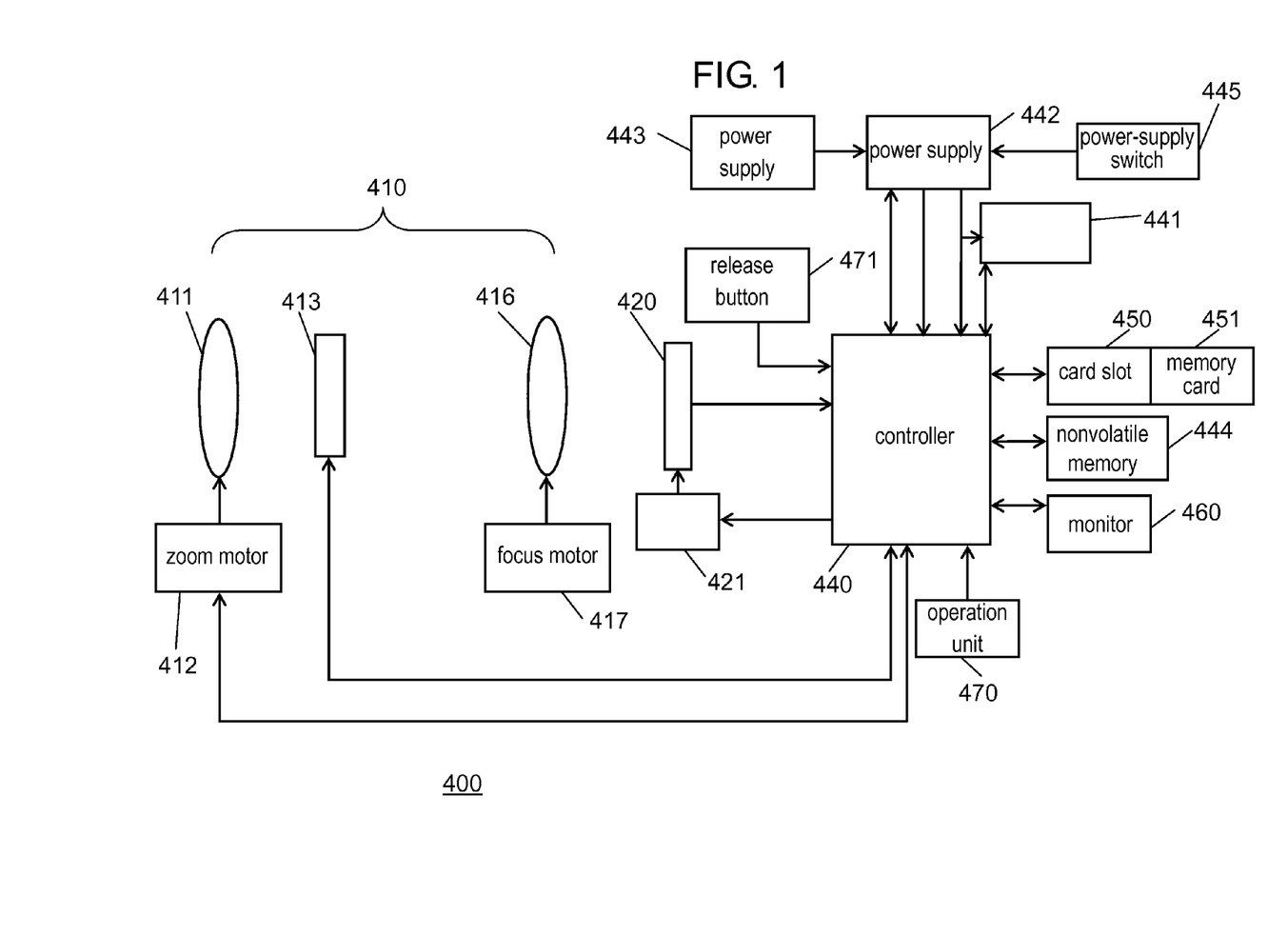
FIG. 1 is a block diagram showing a configuration of a digital camera.

Digital camera 400 shown in FIG. 1 images a subject image formed by optical system 410 by image sensor 420, and generates an image signal.

Optical system 410 includes zoom lens 411, mechanical shutter 413, focus lens 416, and the like. Zoom lens 411 is movable along an optical axis of optical system 410. Optical system 410 can change a focal length according to movement of zoom lens 411. Zoom motor 412 drives zoom lens 411 along the optical axis.

Mechanical shutter 413 transmits or blocks light entering into image sensor 420 at the time of photographing by control from controller 440. Mechanical shutter 413 has a front curtain and a rear curtain. Mechanical shutter 413 is controlled according to a shutter speed set by controller 440. Mechanical shutter 413 operates at a timing when a shutter switch is pressed down fully.

Focus lens 416 is movable along the optical axis. According to the movement of focus lens 416, a focus state of a subject image can be changed. Focus motor 417 drives focus lens 416 along the optical axis.

Image sensor 420 images the subject image formed by optical system 410 so as to generate a image signal as a digital signal. Timing generator 421 transmits a synchronous signal to image sensor 420 according to an instruction of controller 440. Controller 440 controls an operation of image sensor 420 by variously changing the synchronous signal.

Controller 440 controls digital camera 400 as a whole. Controller 440 can be implemented with, for example, microcomputer. Furthermore, controller 440 may consist of one semiconductor chip. Controller 440 may be configured to separately include a semiconductor chip implementing an image processing unit and a semiconductor chip implementing an operation control unit.

Memory card 451 can be placed on card slot 450. Card slot 450 transmits and receives data of memory card 451.

Monitor 460 is connected to controller 440. Monitor 460 can display an image.

Operation unit 470 includes a cross-shaped key, a pressing button, a touch panel, and the like. Operation unit 470 is a member for carrying out various settings of digital camera 400. Release button 471 is an operation member for giving an instruction of shooting release to controller 440 by a user's press-down operation.

Examples of nonvolatile memory 444 include an NAND flash memory. Nonvolatile memory 444 stores programs to be used in controller 440 and data generated by digital camera 400. Nonvolatile memory 444 is electrically connected to controller 440.

Examples of volatile memory 441 include an SDRAM corresponding to LPDDR2 standard. Volatile memory 441 can store programs read out by controller 440 from nonvolatile memory 444. Volatile memory 441 is electrically connected to controller 440 and power supply control unit 442.

Power supply control unit 442 supplies controller 440 and volatile memory 441 with electric power from power supply 443. As power supply 443, batteries such as lithium ion batteries and nickel hydrogen batteries, or household power supply via an AC adaptor are used.

Power-supply switch 445 transmits a signal showing whether the power supply is ON or OFF to power supply control unit 442 in order to enable a power supply ON/OFF operation of controller 440 based on a user's operation. When power supply control unit 442 receives the signal showing whether the power supply is ON or OFF from power-supply switch 445, it controls supply of electric power to controller 440 and volatile memory 441 according to the received signal.

2. Configuration of Data Control in Image Sensor 420, Controller 440 and Volatile Memory 441

As mentioned above, image sensor 420 and volatile memory 441 are connected to controller 440. This embodiment describes a case as an example in which the pixel output rate of image sensor 420 is larger than the processing rate of correction unit 4405 included in controller 440 shown in FIG. 2. In this embodiment, the processing rate of correction unit 4405 denotes correction capability of correction unit 4405. As an example, description is given in which the pixel output rate of image sensor 420 is 20 Mpix/s and the processing rate of correction unit 4405 is 10 Mpix/s. These rates are examples and not construed to limit the present invention.

Figure 2:
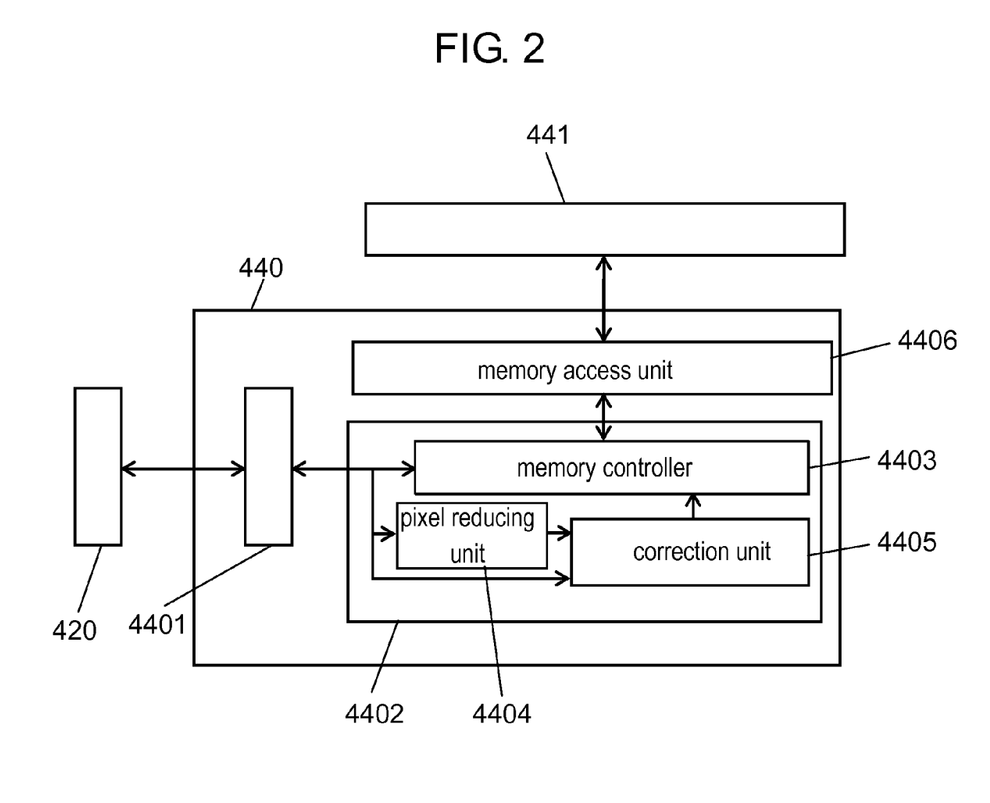
FIG. 2 is a block diagram showing exchange of data.

When the pixel output rate of image sensor 420 is larger than the processing rate of controller 440, if the pixel output rate of image sensor 420 is determined according to the processing rate of controller 440, the photographing speed at the time of continuous shooting (the number of frames that can be photographed for one second) is reduced.

2-1. Configuration of Controller 440

As shown in FIG. 2, controller 440 includes image sensor interface 4401, preprocessing unit 4402, and memory access unit 4406. Preprocessing unit 4402 includes memory controller 4403, pixel reducing unit 4404, and correction unit 4405.

Controller 440 can control drive of image sensor 420. Furthermore, controller 440 captures RAW data output from image sensor 420, and can write and read out them into volatile memory 441.

Image sensor interface 4401 is an interface for capturing the RAW data output from image sensor 420. Image sensor interface 4401 outputs the captured RAW data to preprocessing unit 4402.

Preprocessing unit 4402 includes memory controller 4403, pixel reducing unit 4404, and correction unit 4405. Preprocessing unit 4402 switches processing according to shooting modes. Examples of processing according to shooting modes is described later.

Memory controller 4403 can directly capture the RAW data output from image sensor interface 4401 not through pixel reducing unit 4404 and correction unit 4405. Memory controller 4403 outputs the captured RAW data to memory access unit 4406.

Pixel reducing unit 4404 reduces the RAW data output from image sensor 420. In this embodiment, image sensor 420 outputs the RAW data at a rate of 20 Mpix/s. That is to say, the pixel output rate of image sensor 420 is 20 Mpix/s.

Pixel reducing unit 4404 reduces the RAW data so that correction unit 4405 can process the RAW data. That is to say, pixel reducing unit 4404 reduces the horizontal pixels of the RAW data to, for example, half by pixel mixing (mixing of pixels of the same color). In this case, pixel reducing unit 4404 generates first image data obtained by reducing the RAW data to 10 Mpix/s. Pixel reducing unit 4404 may thin out pixels by electronic zoom instead of pixel mixing.

That is to say, when the RAW data are input at such a rate that correction unit 4405 cannot process the RAW data, pixel reducing unit 4404 generates the first image data by reducing the RAW data to a rate not greater than a rate at which correction unit 4405 can process the RAW data. Pixel reducing unit 4404 outputs the first image data to correction unit 4405.

On the other hand, when the RAW data are output from image sensor 420 at such a rate that correction unit 4405 can process the RAW data, the RAW data are output to correction unit 4405 without passing through pixel reducing unit 4404.

Correction unit 4405 generates second image data by carrying out correction processing with respect to the first image data. Furthermore, correction unit 4405 generates third image data by carrying out correction processing with respect to the RAW data. The correction processing includes flaw correction, white balance correction, zoom processing, and the like. Detailed description is given later, but correction unit 4405 may carry out correction processing with respect to the RAW data output from volatile memory 441.

Correction unit 4405 outputs the second image data and/or the third image data to memory controller 4403.

Memory access unit 4406 writes the RAW data and/or the second image data and/or the third image data output from memory controller 4403 into volatile memory 441. Furthermore, memory access unit 4406 outputs the RAW data and/or the second image data and/or the third image data read out from volatile memory 441 to memory controller 4403.

3. Continuous-Shooting Sequence of Digital Camera 400

Figure 3:
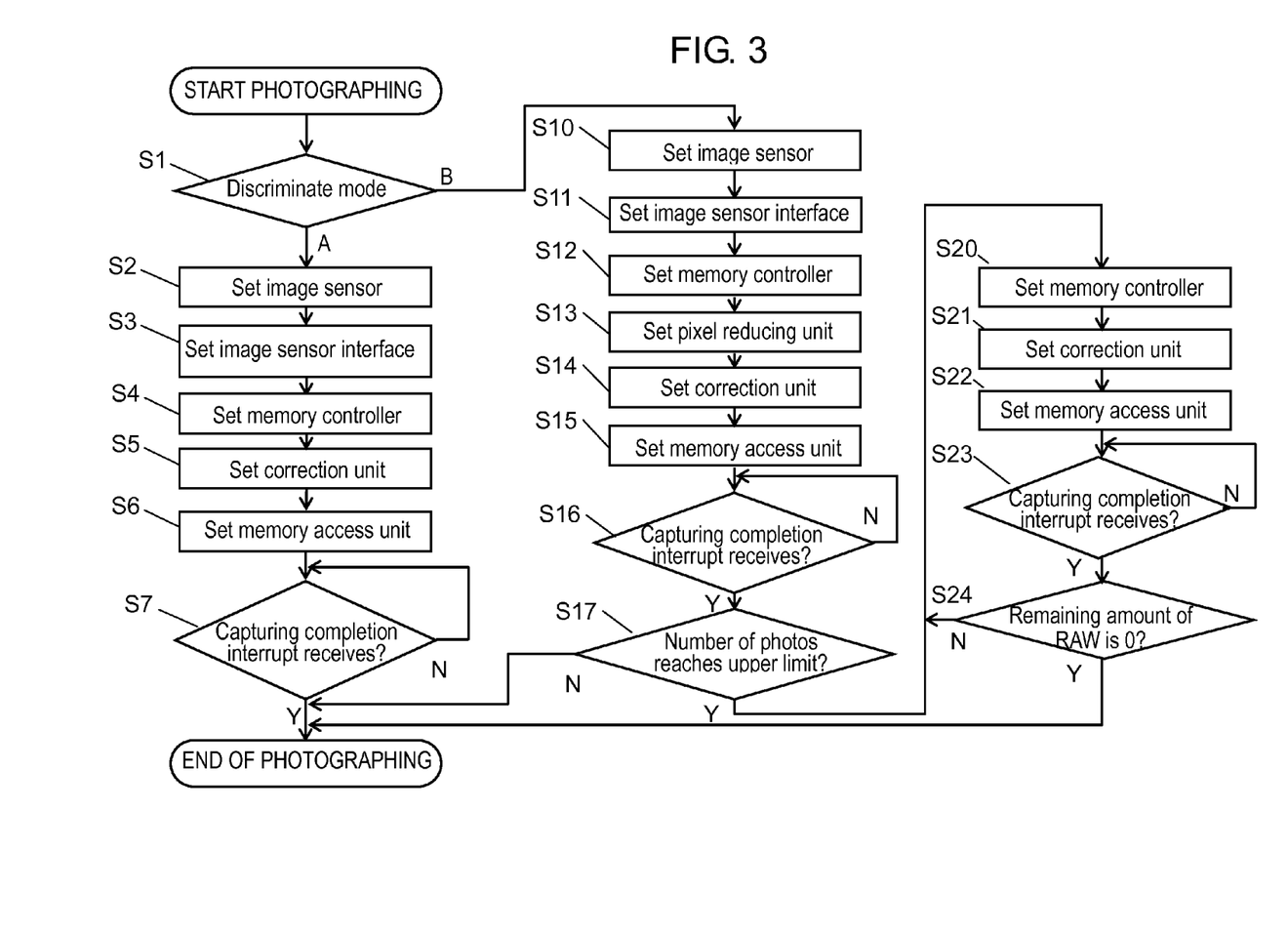
FIG. 3 is a flow chart showing a continuous-shooting sequence.

Hereinafter, a continuous-shooting sequence of digital camera 400 is described. Specifically, a processing flow according to the continuous-shooting mode is described. In this embodiment, as shown in FIG. 3, as one example, a normal continuous-shooting mode and a high-speed continuous-shooting mode are described. For easy understanding, a volume of RAW data obtained in continuous shooting photographing is made to be 10 Mpix per photograph.

3-1. Normal Continuous-Shooting Mode

When release button 471 is pressed down by a user, controller 440 starts photographing. Controller 440 determines a continuous-shooting mode (S1).

When the mode is a normal continuous-shooting mode (A), controller 440 carries out setting of image sensor 420 according to photographing conditions at such a rate that preprocessing unit 4402 can carry out processing (S2). For example, when the processing rate of preprocessing unit 4402 is 10 Mpix/s, controller 440 sets image sensor 420 at a pixel output rate corresponding to the processing rate. Then, controller 440 carries out setting of image sensor interface 4401 (S3), setting of memory controller 4403 (S4), setting of correction unit 4405 (S5), and setting of memory access unit 4406 (S6), sequentially, such that the RAW data can be captured at the pixel output rate of image sensor 420 set in S2.

That is to say, controller 440 generates third image data by carrying out correction processing in correction unit 4405 with respect to the RAW data captured by image sensor interface 4401. Controller 440 records the third image data in volatile memory 441 via memory controller 4403. Controller 440 waits for capturing completion interrupt from memory controller 4403 (S7). Then, controller 440 finishes photographing when the capturing completion interrupt of memory controller 4403 is received. Controller 440 repeats the same processing (S2 to S7) when release button 471 is continued to be pressed. As mentioned above, normal continuous shooting is implemented. The photographing speed (the number of frames that can be photographed for one second) in the normal continuous shooting is 10 Mpix/s. In the normal continuous-shooting mode, controller 440 can process about one image per second.

Note here that controller 440 carries out YC processing with respect to the third image data recorded in volatile memory 441. Then, controller 440 generates a preview image to be displayed on monitor 460 by changing the size of the YC-processed image data. Controller 440 outputs the preview image on monitor 460. Furthermore, controller 440 generates an Exif file by converting the YC-processed image data into a JPEG image. Controller 440 records the Exif file in memory card 451.

3-2. High-Speed Continuous-Shooting Mode

When release button 471 is pressed down by a user, controller 440 starts photographing. Controller 440 determines a continuous-shooting mode (S1).

When the mode is a high-speed continuous-shooting mode (B), controller 440 carries out setting of image sensor 420 according to photographing conditions in which outputting can be carried out at the maximum speed of image sensor 420 (S10). For example, controller 440 sets image sensor 420 at the pixel output rate of 20 Mpix/s when the maximum pixel output rate of image sensor 420 is 20 Mpix/s. Then, controller 440 carries out setting of image sensor interface 4401 (S11), setting of memory controller 4403 (S12), setting of pixel reducing unit 4404 (S13), setting of correction unit 4405 (S14), and setting of memory access unit 4406 (S15), sequentially, such that the RAW data can be captured at the pixel output rate of image sensor 420 set in S10.

That is to say, controller 440 outputs the RAW data as it is, which are captured by image sensor interface 4401, in memory access unit 4406 via memory controller 4403. Memory access unit 4406 records the RAW data in volatile memory 441. Concurrently with the processing for recording the RAW data as it is into volatile memory 441, controller 440 generates first image data by reducing the RAW data captured by image sensor interface 4401 in pixel reducing unit 4404. For example, pixel reducing unit 4404 reduces horizontal pixels to half by pixel mixing. The first image data are output to correction unit 4405. Correction unit 4405 generates second image data by carrying out correction processing with respect to the first image data. Controller 440 inputs the second image data into memory access unit 4406 via memory controller 4403. Memory access unit 4406 records the second image data in volatile memory 441.

In this way, volatile memory 441 records the RAW data and the second image data. Controller 440 waits for capturing completion interrupt from memory controller 4403 (S16). When controller 440 receives the capturing completion interrupt from memory controller 4403, it detects unoccupied area of volatile memory 441 and the like. Controller 440 determines whether or not the continuous shooting reaches the upper limit of the number of photos (S17). Whether or not the number of photos reaches the upper limit can be determined, for example, by previously determining the upper limit of the number of the RAW data to be captured.

When the number of photos does not reach the upper limit, controller 440 finishes photographing. Then, controller 440 repeats the same processing (S10 to S17) when release button 471 is continued to be pressed.

Note here that controller 440 carries out YC processing with respect to the second image data recorded in volatile memory 441. Then, controller 440 generates a preview image to be displayed on monitor 460 by changing the size of the YC-processed image data. Controller 440 outputs the preview image on monitor 460.

On the other hand, when the number of photos reaches the upper limit, controller 440 carries out setting of memory controller 4403 (S20), setting of correction unit 4405 (S21), and setting of memory access unit 4406 (S22), sequentially. That is to say, controller 440 replaces the RAW data recorded in volatile memory 441 with the third image data supposed to be stored. Specifically, controller 440 reads out the RAW data from volatile memory 441 by memory controller 4403 via memory access unit 4406. At this time, memory controller 4403 reads out the RAW data via memory access unit 4406 at such a rate that correction unit 4405 can carry out processing (10 Mpix/s), and inputs them into correction unit 4405. Correction unit 4405 generates the third image data by carrying out correction processing with respect to the RAW data. Controller 440 inputs the third image data into memory access unit 4406 via memory controller 4403. Memory access unit 4406 records the third image data into volatile memory 441.

Controller 440 waits for capturing completion interrupt from memory controller 4403 (S23). When controller 440 receives capturing completion interrupt from memory controller 4403, the steps proceeds to the following processing of RAW data.

Herein, controller 440 checks a remaining amount of the RAW data in volatile memory 441. When the remaining amount of the RAW data in volatile memory 441 is not 0, controller 440 repeats processing of S20 to S23. As mentioned above, the RAW data recorded in volatile memory 441 is replaced with the third image data. When the remaining amount of the RAW data in volatile memory 441 becomes 0, controller 440 finishes replacing processing. Thus, the photographing speed (the number of frames that can be photographed for one second) capable of implementing the high-speed continuous shooting is 20 Mpix/s. Note here that in the high-speed continuous-shooting mode, controller 440 can process about two images per second.

Note here that controller 440 carries out YC processing with respect to the third image data recorded in volatile memory 441. Furthermore, controller 440 generates an Exif file by converting the YC-processed image data into a JPEG image. Controller 440 records the Exif file in memory card 451.

4. High-Speed Continuous-Shooting Sequence

Figure 4:
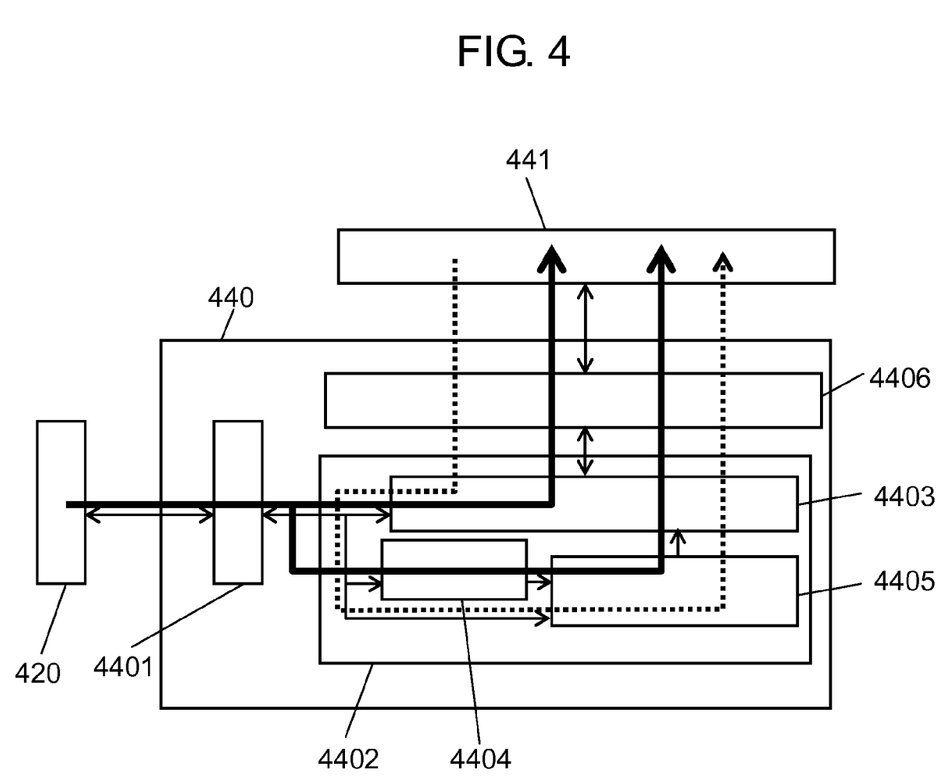
FIG. 4 is a block diagram for illustrating a high-speed continuous-shooting sequence.
Figure 5:
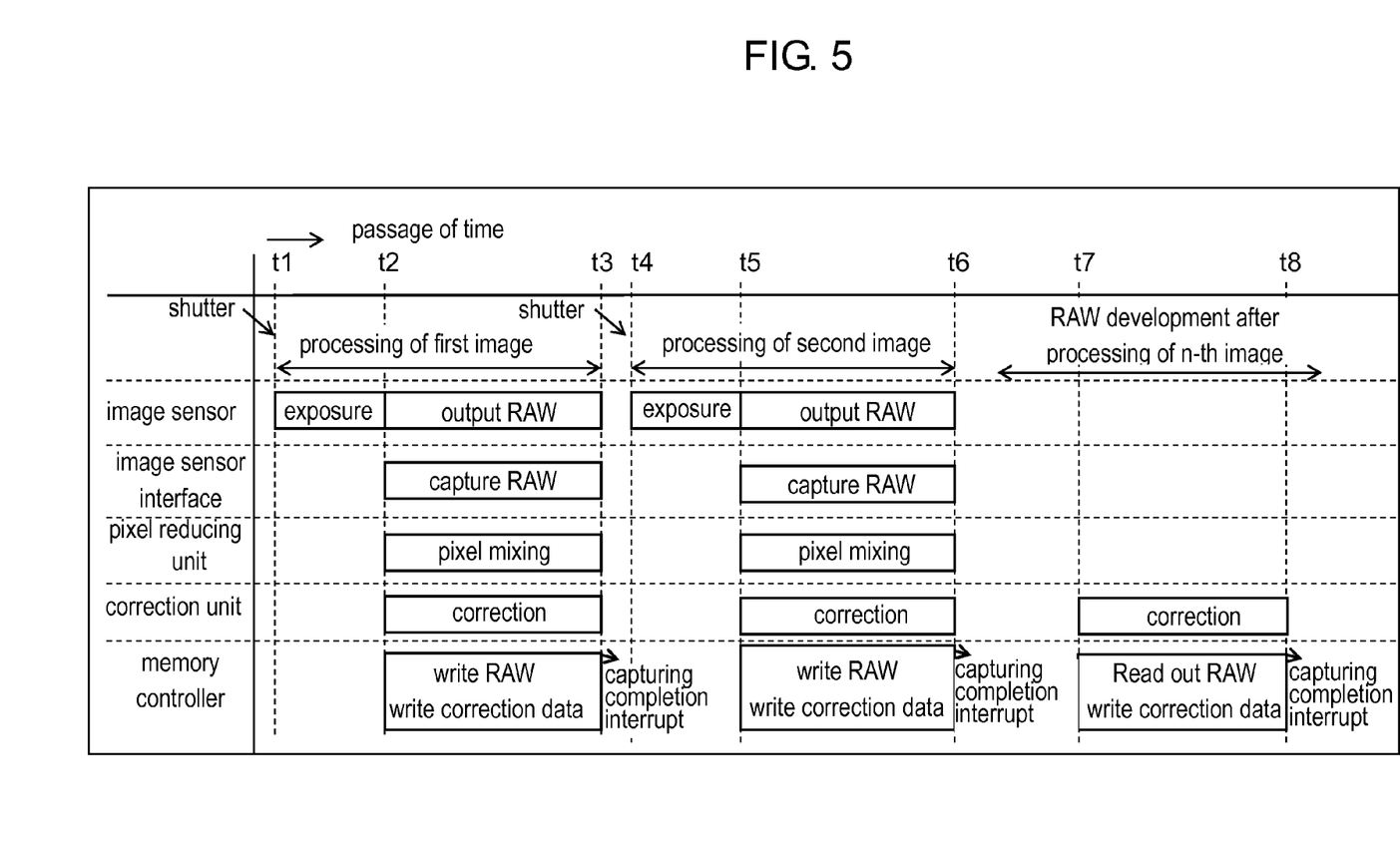
FIG. 5 is a timing chart for illustrating the high-speed continuous-shooting sequence.

Hereinafter, a high-speed continuous-shooting sequences shown in FIGS. 4 and 5 are described.

4-1. t1 to t2 t1 denotes a state in which release button 471 is pressed down. From t1 to t2, image sensor 420 is in an exposure state. At t2, exposure of image sensor 420 is completed.

4-2. t2 to t3

From t2 to t3, image sensor 420 outputs RAW data. Furthermore, image sensor interface 4401 captures the RAW data output from image sensor 420, and outputs them to preprocessing unit 4402. Furthermore, pixel reducing unit 4404 generates first image data by carrying out pixel-mixing of pixels of the same color with respect to the RAW data output from image sensor interface 4401. Pixel reducing unit 4404 outputs the first image data to correction unit 4405 by reducing the data rate to half or less.

Correction unit 4405 generates second image data by carrying out correction processing with respect to the first image data whose processing rate has been reduced. Correction unit 4405 outputs the second image data to memory controller 4403. Memory controller 4403 captures both the RAW data output from image sensor interface 4401 and the second image data output from correction unit 4405, and outputs them into memory access unit 4406.

4-3. t3 to t4

From t3 to t4, controller 440 waits for capturing completion interrupt. After memory controller 4403 finishes capturing of all data, it outputs the capturing completion interrupt.

4-4. t4 to t7 t4 denotes a timing at which next shutter is detected. The following t5 corresponds to t2, and t6 corresponds to t3. Then, every time a shutter is detected, t4 to t6 are repeated.

Paths corresponding to t1 to t3 and t4 to t6 are paths shown by a solid line in FIG. 4. t7 denotes the time when photographing is finished or when the number of photos reaches the upper limit.

4-5. t7 to t8

From t7 to t8, controller 440 reads out the RAW data recorded in volatile memory 441 by memory controller 4403. Correction unit 4405 generates third image data by correcting the RAW data. Memory access unit 4406 stores the third image data in volatile memory 441.

When capturing is carried out normally, at a timing of t8, the capturing completion interrupt is output from memory controller 4403. When the remaining amount of the RAW data in volatile memory 441 is not 0, t7 to t8 are repeated in order to carry out processing of the remaining RAW data. When the remaining amount of the RAW data in volatile memory 441 becomes 0, photographing is finished.

Paths corresponding to t7 to t8 are paths shown by a dotted line in FIG. 4.

5. Normal Continuous-Shooting Sequence

Figure 6:
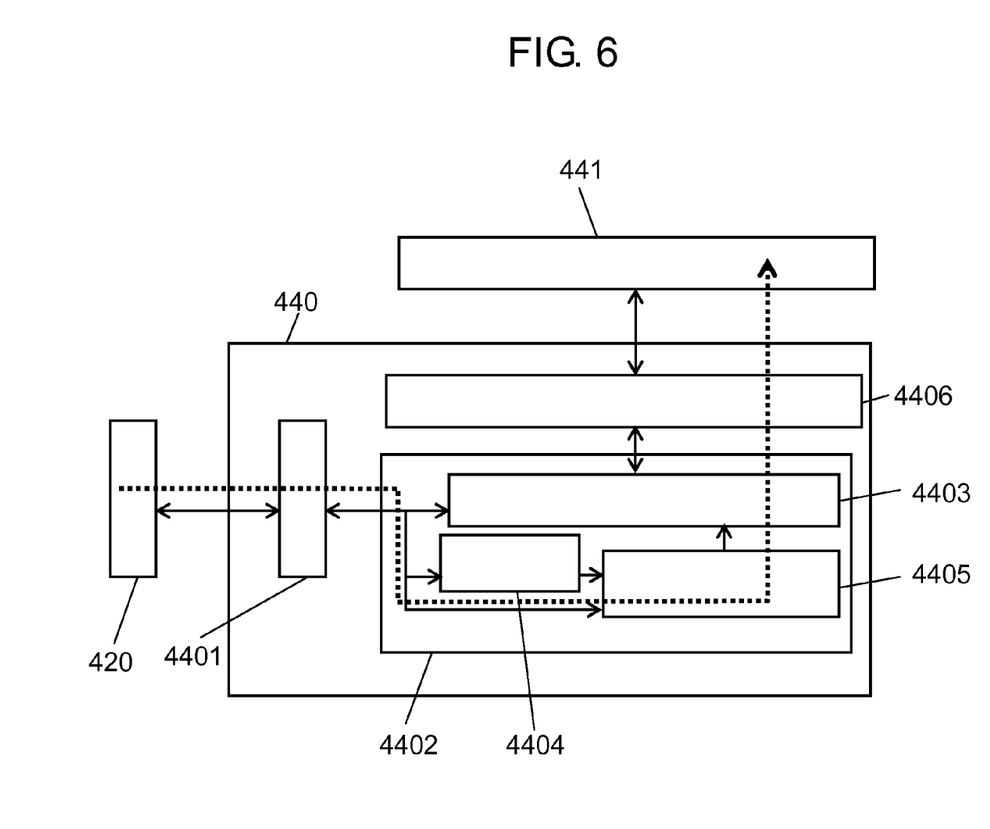
FIG. 6 is a block diagram for illustrating a normal continuous-shooting sequence.
Figure 7:
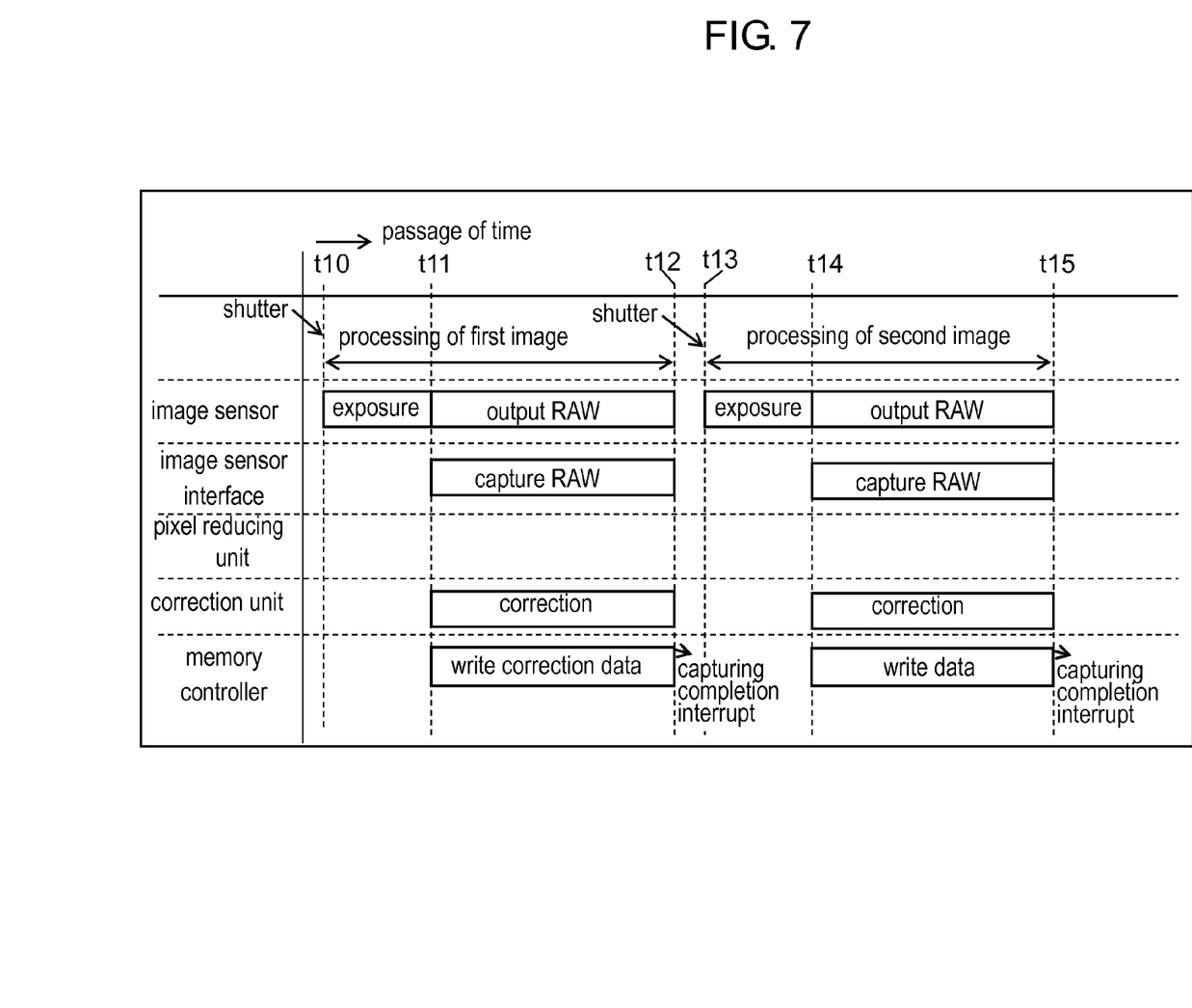
FIG. 7 is a timing chart for illustrating the normal continuous-shooting sequence.

Hereinafter, a normal continuous-shooting sequence shown in FIGS. 6 and 7 is described.

5-1. t10 to t11 t10 denotes a state in which release button 471 is pressed down. From t10 to t11, image sensor 420 is in an exposure state. At t11, exposure of image sensor 420 is completed.

5-2. t11 to t12

From t11 to t12, image sensor 420 outputs RAW data. Furthermore, image sensor interface 4401 captures the RAW data output from image sensor 420, and outputs them to preprocessing unit 4402. Furthermore, correction unit 4405 generates third image data by carrying out correction processing with respect to the RAW data. Correction unit 4405 outputs the third image data to memory controller 4403. Memory controller 4403 captures the third image data output from correction unit 4405, and outputs them into memory access unit 4406.

5-3. t12 to t13

From t12 to t13, controller 440 waits for capturing completion interrupt. When memory controller 4403 finishes capturing of all data, it outputs the capturing completion interrupt.

t13 denotes a timing at which next shutter is detected. The following t14 corresponds to t11, and t15 corresponds to t12. Then, every time a shutter is detected, t13 to t15 are repeated. If release button 471 is not newly pressed down, photographing is finished.

Paths corresponding to t10 to t12 are paths shown by a dotted line in FIG. 6.

6. Advantage

Digital camera 400 of the present disclosure includes controller 440, image sensor 420 connected to controller 440 and outputting RAW data and volatile memory 441 connected to controller 440. Image sensor 420 is configured to output the RAW data to controller 440 at a predetermined pixel output rate (for example, 20 Mpix/s). Controller 440 generates first image data by reducing the RAW data output from image sensor 420. Controller 440 generates second image data by carrying out correction processing with respect to the first image data. Controller 440 is configured to store the RAW data output from image sensor 420 and the second image data into volatile memory 441.

With the above-mentioned configuration, in digital camera 400, even when controller 440 cannot carry out processing in real time, at the pixel output rate of image sensor 420, digital camera 400 can store the RAW data in volatile memory 441. Therefore, even when the pixel output rate of image sensor 420 is larger than the processing rate of controller 440, the photographing speed at the time of continuous shooting can be further improved.

Note here that controller 440 may be configured to set a reduction rate (for example, 50%) when the first image data are generated, based on the capability of the correction processing (for example, processing rate: 10 Mpix/s) and the pixel output rate of image sensor 420 (for example, 20 Mpix/s). In more detail, controller 440 may be configured to set a reduction rate (for example, 50%) when pixel reducing unit 4404 generates the first image data, based on the capability of the correction processing in correction unit 4405 (for example, processing rate: 10 Mpix/s) and the pixel output rate of image sensor 420 (for example, 20 Mpix/s).

With these configurations, the first image data can be generated at an appropriate reduction rate.

Furthermore, controller 440 may be configured to read out the RAW data stored in volatile memory 441 (for example, read-out rate: 10 Mpix/s) according to the capability of correction processing (for example, processing rate: 10 Mpix/s), to generate the third image data by carrying out correction processing with respect to the read-out RAW data, and to store the third image data in volatile memory 441.

In more detail, memory controller 4403 may be configured to read out the RAW data stored in volatile memory 441 (for example, read-out rate: 10 Mpix/s) according to the capability of correction processing of correction unit 4405 (for example, processing rate: 10 Mpix/s), and to output them into correction unit 4405 (for example, processing rate: 10 Mpix/s). Correction unit 4405 may be configured to generate the third image data by carrying out correction processing with respect to the RAW data output from memory controller 4403, and to store the third image data in volatile memory 441 via memory controller 4403.

The RAW data temporarily stored in volatile memory 441 are read out at a rate lower than the pixel output rate of image sensor 420, and input into a controller at a rate not higher than the correction capability. Thereby, correction processing supposed to be carried out is carried out with respect to the RAW data, and then the RAW data can be written back into volatile memory 441 again.

The imaging method of the present disclosure is an imaging method of digital camera 400 including image sensor 420 for outputting RAW data at a predetermined pixel output rate (for example, 20 Mpix/s) and volatile memory 441. The imaging method of the present disclosure includes generating first image data by reducing the RAW data output by image sensor 420, generating second image data by carrying out correction processing with respect to the first image data, and storing the RAW data and the second image data into volatile memory 441.

The imaging method of the present disclosure permits storing the RAW data into volatile memory 441 even when correction processing cannot be carried out at the same rate as that of the pixel output rate of image sensor 420. Therefore, even when the pixel output rate of image sensor 420 is larger than the rate of the correction processing, the photographing speed at the time of continuous shooting can be further improved.

Note here that the imaging method of the present disclosure may further include setting the reduction rate (for example, 50%) when the first image data are generated, based on the capability of the correction processing (for example, processing rate: 10 Mpix/s) and the pixel output rate (for example, 20 Mpix/s). With these configurations, the first image data can be generated at an appropriate reduction rate.

Furthermore, the imaging method of the present disclosure may further include reading out the RAW data stored in volatile memory 441, generating the third image data by carrying out correction processing with respect to the read-out RAW data, and storing the third image data in volatile memory 441 according to the capability of the correction processing.

The RAW data temporarily stored in volatile memory 441 are read out at a rate lower than the pixel output rate of image sensor 420 (for example, processing rate: 10 Mpix/s), and input into a controller at a rate not higher than the correction capability (for example, processing rate: 10 Mpix/s). Thereby, correction processing, which has naturally been carried out, is carried out with respect to the RAW data, and then, the RAW data can be written back into volatile memory 441 again.

As mentioned above, the embodiments are described as an example of technology according to the present disclosure. For description, attached drawings and detailed description are provided.

Furthermore, the above-mentioned embodiments are provided so as to show technology according to the present disclosure. Therefore, various modification, replacement, addition, and omit can be carried out within the scope of claims or equivalence thereof.

What is claimed is:

1. An imaging device comprising:
a controller configured to carry out a correction processing with respect to an image data;
an image sensor connected to the controller and outputting RAW data; and
a memory connected to the controller,
wherein the image sensor is configured to output the RAW data to the controller at a predetermined pixel output rate, and
the controller is configured to generate a first image data by reducing the RAW data output from the image sensor, to generate a second image data by carrying out the correction processing on the first image data, and to store the second image data concurrently with storing the RAW data output from the image sensor into the memory, in a case where the pixel output rate is higher than a processing rate of the correction processing.

2. The imaging device of claim 1, wherein, based on capability of the correction processing and the pixel output rate, the controller is configured to set a reduction rate for generating the first image data.

3. The imaging device of claim 1, wherein, with reference to the capability of the correction processing, the controller is configured to read out the RAW data stored in the memory, to generate third image data by carrying out the correction processing with respect to the read-out RAW data, and to store the third image data in the memory.

4. The imaging device of claim 2, wherein, with reference to the capability of the correction processing, the controller is configured to read out the RAW data stored in the memory, to generate third image data by carrying out the correction processing with respect to the read-out RAW data, and to store the third image data in the memory.

5. The imaging device of claim 1, wherein the controller includes:
a pixel reducing unit configured to generate the first image data by reducing the RAW data output from the image sensor;
a correction unit configured to generate the second image data by carrying out the correction processing on the first image data; and
a memory controller configured to store the RAW data output from the image sensor and the second image data in the memory.

6. The imaging device of claim 5, wherein, based on the capability of the correction processing in the correction unit and the pixel output rate, the controller is configured to set a reduction rate for the pixel reducing unit generating the first image data.

7. The imaging device of claim 5, wherein the memory controller is configured to read out the RAW data stored in the memory according to the capability of the correction processing of the correction unit, and to output them to the correction unit;
the correction unit is configured to generate the third image data by carrying out the correction processing with respect to the RAW data output from the memory controller, and to store the third image data in the memory via the memory controller.

8. The imaging device of claim 6, wherein the memory controller is configured to read out the RAW data stored in the memory according to the capability of the correction processing of the correction unit, and to output them to the correction unit;
the correction unit is configured to generate the third image data by carrying out the correction processing with respect to the RAW data output from the memory controller, and to store the third image data in the memory via the memory controller.

9. An imaging method of an image device comprising an image sensor outputting RAW data at a predetermined pixel output rate, and a memory, the method comprising:
generating a first image data by reducing the RAW data output by the image sensor;
generating a second image data by carrying out a correction processing on the first image data; and
storing the second image data concurrently with storing the RAW data into the memory, in a case where the pixel rate is higher than a processing rate of the correction processing.

10. The imaging method of claim 9, further comprising:
setting a reduction rate for generating the first image data, based on capability of the correction processing and the pixel output rate.

11. The imaging method of claim 9, further comprising:
reading out the RAW data stored in the memory according to the capability of the correction processing;
generating third image data by carrying out the correction processing to the read-out RAW data; and
storing the third image data in the memory.

12. The imaging method of claim 10, further comprising:
reading out the RAW data stored in the memory according to the capability of the correction processing;
generating third image data by carrying out the correction processing to the read-out RAW data; and
storing the third image data in the memory.

* * * * *